United States Patent [19]

Asai et al.

[11] Patent Number: 4,882,130
[45] Date of Patent: Nov. 21, 1989

[54] POROUS STRUCTURE OF FLUID CONTACT

[75] Inventors: Katsuya Asai, Nagoya; Hideyuki Masaki, Gifu, both of Japan

[73] Assignee: NGK Insulators, Ltd., Nagoya, Japan

[21] Appl. No.: 203,133

[22] Filed: Jun. 7, 1988

[51] Int. Cl.$^4$ ................................................ B32B 3/12
[52] U.S. Cl. .................................... 422/310; 422/180; 428/116; 428/131; 502/527
[58] Field of Search ................ 422/180, 191, 222, 310; 502/527; 428/116, 131

[56] References Cited

U.S. PATENT DOCUMENTS

| | | | |
|---|---|---|---|
| 2,730,434 | 1/1956 | Houdry | 422/191 X |
| 3,466,151 | 9/1969 | Sicard et al. | 422/191 |
| 3,825,460 | 7/1974 | Yoshikawa et al. | 502/527 X |
| 3,853,485 | 12/1974 | Hogan | 502/527 X |
| 4,207,202 | 6/1980 | Cole, Jr. | 422/133 X |
| 4,532,086 | 7/1985 | Pluss | 428/116 X |
| 4,533,584 | 8/1985 | Takeuchi et al. | 428/118 X |
| 4,719,090 | 1/1988 | Masaki | 428/116 X |

Primary Examiner—Henry F. Epstein
Attorney, Agent, or Firm—Arnold, White & Durkee

[57] ABSTRACT

A porous structure consisting of one or more packings each consisting of honeycomb blocks arranged in a first direction in the plane of the packing perpendicular to the nominal direction of fluid flow through the structure. Each block includes partition walls which define channels inclined to the nominal direction and provided in parallel rows arranged in the first direction. The walls include intersections by which the channels of each row are spaced apart from each other in a second direction perpendicular to the first direction. The walls define a pair of voids between the adjacent channels of each row, at least one of the voids constituting part of the channels of the adjacent rows. Perforations are formed through the walls in a direction intersecting the rows of channels, for fluid communications between the adjacent channels of each row and adjacent rows. The honeycomb blocks are connected to each other such that directions of inclination of the channels of the adjacent blocks are reversed to each other. A complex channel is formed between the adjacent blocks, by outer openings defined outwardly of each block by the voids associated with the outermost row of channels of each block.

10 Claims, 9 Drawing Sheets

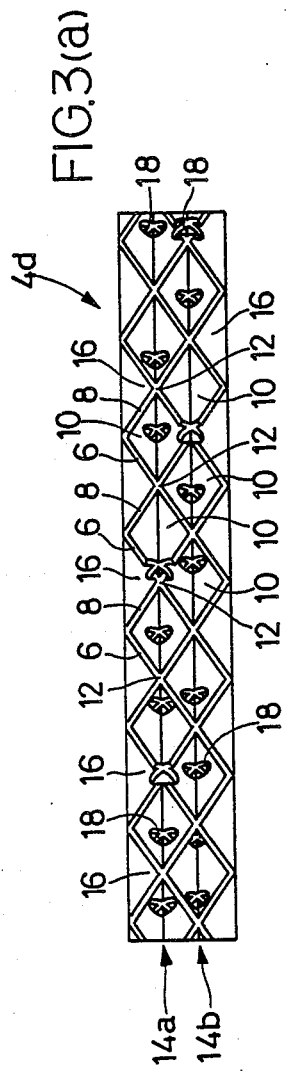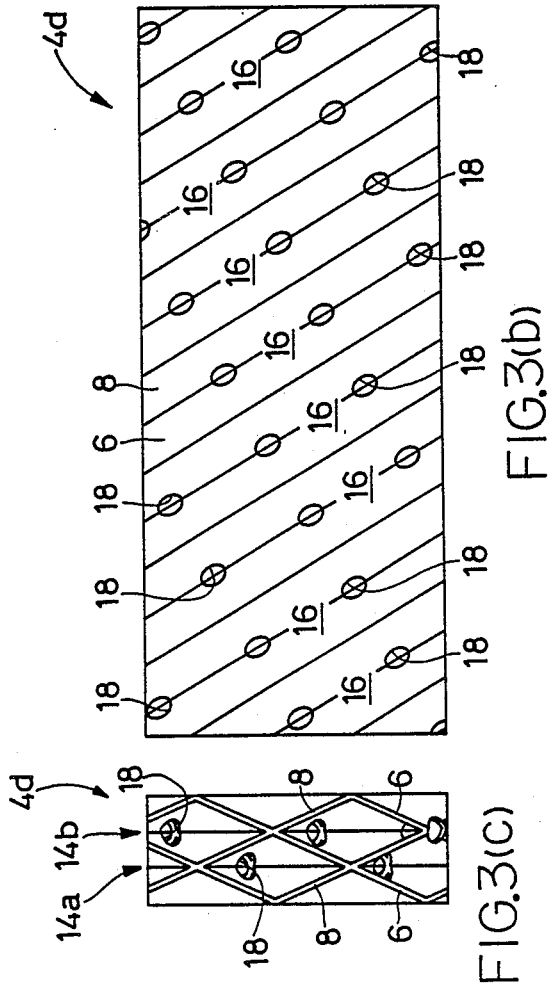

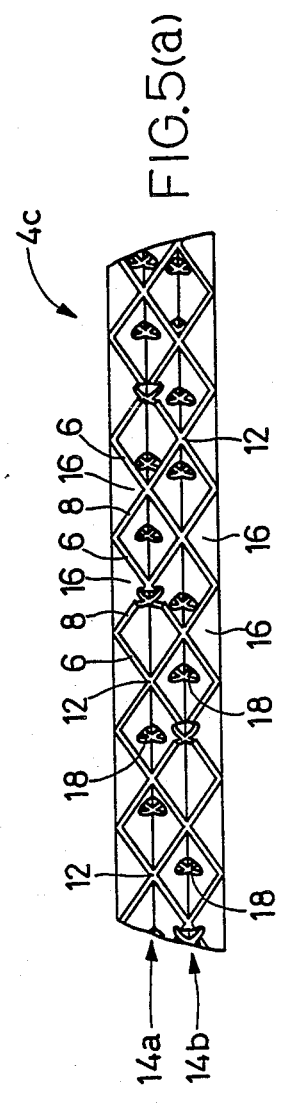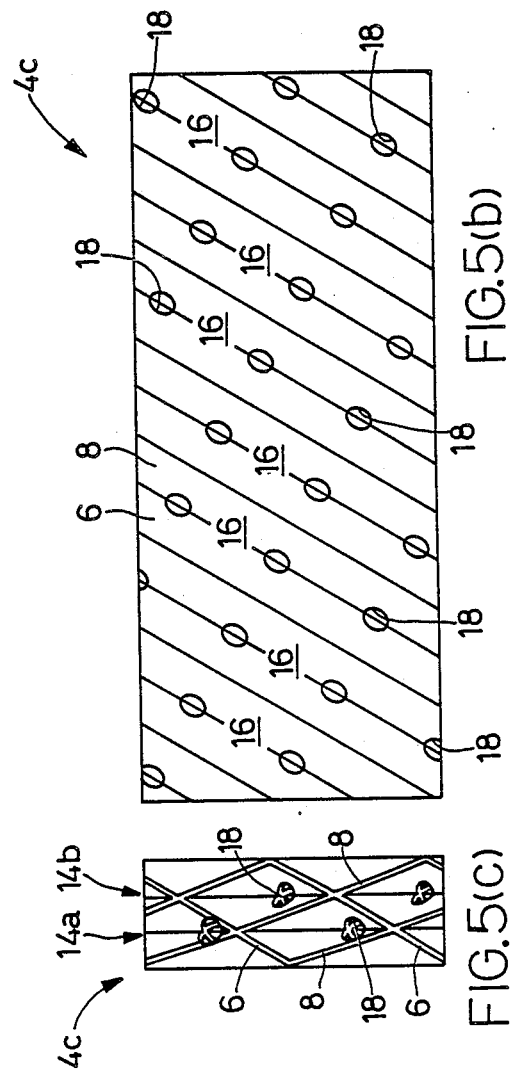

POROUS STRUCTURE OF FLUID CONTACT

BACKGROUND OF THE INVENTION

1. Background of the Invention

The present invention relates to a porous structure used in inter-fluid contact equipment to achieve contact between gases, between liquids or between gas and liquid, for various industrial purposes, such as packed towers for distillation, absorption, cooling and stripping. The invention further relates to a porous structure used for contact between fluid and catalyst.

In the art of such inter-fluid or fluid-catalyst contactors for various industrial applications, different types of packings have been used to fill towers or columns for intended chemical processings. These packings, which are made of ceramics, glass, synthetic resin or metal, are dumped into a tower in random or in an irregular fashion in the form of beads, pellets, rings (cylinders), sheets, and so forth. Alternatively, the packings are arranged in the tower in a regular or stacked fashion in the form of grids or honeycombs. Although the irregular dumping method permits easy filling of the tower with the packings, it suffers a loss of pressure of the fluids flowing through the irregularly dumped packings. In view of this inconvenience, regularly stacked packings in the form of grids, honeycombs, etc. have been dominantly used for recent years, for minimum pressure loss of the fluids, notwithstanding comparatively time-consuming filling of the tower with such regularly stacked packings.

In the case where a tower is filled with known regularly stacked packings of grid or honeycomb type, it is a common practice that the fluid flow channels formed through the packings are generally oriented substantially in parallel to the line of flow of the fluid through the tower. As a result, the pressure loss encountered with this regular arrangement is less than that experienced on pellet-type packings or other irregularly dumped packings. However, the stacked packings suffer a relatively low frequency of collision between liquid and gas, which results in a local blow or channeling of the gas without contacting the liquid, thus reducing the liquid-gas contact efficiency.

Similar inconveniences are also experienced in the case where such packings are used to fill a tower through which a gas or liquid is caused to flow for contact with a catalyst supported on the packings, in order to catalyze such a fluid during its flow through the tower.

In view of the inconveniences described above, H. Masaki, one of the co-inventors of the present invention proposed a porous structure which provides for reduced pressure loss and permits improved efficiency of contact between fluids, as disclosed in U.S. Pat. No. 4,719,090.

The disclosed porous structure through which at least one fluid flows, comprises a plurality of stacked packings, each stacked packing including a plurality of adjacent located honeycomb blocks. Each honeycomb block comprises: (a) a plurality of first partition walls extending in a first direction and having a longitudinal axis, each of the first partition walls being spaced apart from each other in a second direction which is substantially perpendicular to the first direction, and the plurality of first partition walls being in a substantially parallel relationship, and (b) a plurality of second partition walls extending in the second direction, such that each second partition wall contacts two adjacent first partition walls along a substantial length of each of the second partition walls, the second partition walls being spaced apart from each other and being inclined relative to the longitudinal axis of the first partition walls, the first and second partition walls cooperating to form a plurality of inclined parallel channels in each honeycomb block. The adjacently located honeycomb blocks in each of the stacked packings have all longitudinal axis of the first partition walls of each honeycomb block in a substantially parallel relationship with each other and the inclined parallel channels of adjacent honeycomb blocks are inclined with regard to each other, and when the packings are superposed, inclined channels of honeycomb blocks in a first packing communicate with inclined channels of corresponding honeycomb blocks in a second packings in a zigzag manner, thereby forming a plurality of zigzag fluid passages through the porous structure. The second partition walls have perforations formed through the thickness thereof, the inclined parallel channels in each honeycomb block communicating with each other through the perforations.

However, a further investigation by the present inventors revealed a limited efficiency of fluid contact in a porous structure of the type described above. Described more particularly, the porous structure as disclosed in the above-identified U.S. Patent has perforations formed through the second partition walls, so that a fluid or fluids may flow between the adjacent parallel channels through the perforations, in the nominal direction in which a mass of the fluid or fluid as a whole flows through the porous structure. However, the first partition walls extending perpendicularly to the nominal fluid flow direction of the structure have no perforations, and therefore do not permit fluid communications in the direction perpendicular to the nominal fluid flow direction. Further, the porous structure in question does not permit fluid communications between the adjacent honeycomb blocks which are arranged in the direction perpendicular to the nominal fluid flow direction. For these reasons, the improvement in the efficiency of contact between liquids or between a liquid and a gas, that can be offered by the proposed porous structure is more or less limited. Even if the first partition walls are formed with perforations, these perforations merely permit fluid communications between the adjacent parallel channels on both sides of each first partition wall. Since the first partition walls extend parallel to the nominal fluid flow direction of the porous structure, the fluid movements through the perforations in the first partition walls can not be sufficient.

SUMMARY OF THE INVENTION

It is accordingly an object of the present invention to provide an improved porous structure for inter-fluid or fluid-catalyst contact, which permits reduced fluid pressure loss and sufficiently improved efficiency of contact between fluids or between fluid and catalyst.

The above object can be achieved according to the principle of the present invention, which provides a porous structure through which at least one fluid flows in a nominal direction, comprising at least one packing which has a predetermined thickness in the nominal fluid flow direction and which is disposed so as to extend in a plane perpendicular to the nominal direction. Each packing consists of a plurality of honeycomb blocks arranged in a first direction in the above-indicated plane. Each honeycomb block includes a plurality of partition walls which define a plurality of inclined channels which are inclined by a predetermined angle with respect to the nominal fluid flow direction. Each of the inclined channels has opposite open ends at respective upstream and downstream ends of the relevant honeycomb block, as seen in the nominal fluid flow direction of the porous structure. The inclined channels of each honeycomb block are provided in a plurality of parallel rows arranged in the above-indicated first direction. The inclined channels of each row are spaced apart from each other in a second direction in the above-indicated plane, which second direction is perpendicular to the first direction. The partition walls of each honeycomb block include intersections by which the inclined channels of each row are spaced apart from each other in the second direction. The partition walls of each honeycomb block further define a pair of voids between the adjacent inclined channels of each row. The pair of voids are disposed on opposite sides of each of the intersections as seen in the first direction such that at least one of the pair of voids constitutes part of the inclined channels of the rows adjacent to the relevant row. One of the pair of voids associated with the row which forms an outermost row forms an outer opening which is open outwardly of the relevant honeycomb block. The partition walls of each honeycomb block have a plurality of perforations formed therethrough in a direction intersecting the rows of the inclined channels, so as to provide fluid communications between the adjacent inclined channels of each row, between the inclined channels of the adjacent rows, and between the inclined channels and the outer opening. The plurality of honeycomb blocks are positioned and connected to each other such that directions of inclination of the inclined channels of the adjacent honeycomb blocks are reversed to each other with respect to the nominal fluid flow direction of the porous structure, and such that the outer openings formed between the adjacent honeycomb blocks define a complex channel therebetween.

In the porous structure of the present invention constructed as described above, the direction in which the perforations are formed through the partition walls of each honeycomb block intersects the rows of the inclined channels, so that the perforations permit the fluid or fluids to flow therethrough between the adjacent inclined channels and outer openings of the honeycomb blocks. Further, the inclination of the inclined channels facilitates the fluid flows through the perforations from one channel or outer opening to another, in the directions perpendicular the nominal fluid flow direction, as well as in the nominal fluid flow direction. Therefore, the instant porous structure provides improved distribution and contact efficiency of the fluids. Moreover, the fluid distribution and contact efficiency of the instant porous structure are further improved by the complex channel formed between the adjacent honeycomb blocks, which are positioned relative to each other such that the rows of the inclined channels of one of the adjacent blocks intersect the rows of the inclined channels of the other block.

In one form of the porous structure of the present invention, the perforations are formed through the intersections of the partition walls of each honeycomb block, thereby providing fluid communications between the adjacent inclined channels of each row, between the adjacent inclined channels of the adjacent rows, and between the inclined channels and the outer openings.

In the above form of the porous structure, the perforations may be formed through the intersections of the partition walls, in a direction perpendicular to a line of extension of the inclined channels. The perforations are formed so as to permit flows of the fluid therethrough in the above-indicated second direction. In this case, the perforations of each honeycomb block may consist of a plurality of perforations associated with each row of inclined channels, which perforations are spaced apart from each other by a predetermined distance in the above-indicated second direction. The perforations associated with the adjacent rows of inclined channels may be arranged in a zigzag manner such that each of the perforations associated with one of the adjacent rows is positioned between the adjacent perforations associated with the other of the adjacent rows, as viewed in the second direction.

In another form of the instant porous structure, the partition walls of each honeycomb block consist of a plurality of first mutually spaced-apart parallel partition walls, and a plurality of second mutually spaced-apart parallel partition walls which intersect the first parallel partition walls, at the above-indicated intersections, such that the first and second parallel partition walls cooperate to define the rows of inclined channels such that the rows are arranged in the above-indicated first direction and such that each of the inclined channels has a quadrangular cross sectional shape. Each of the outer openings is defined by one of the first parallel partition walls which partially defines the outermost row of inclined channels, and one of the second parallel partition walls which partially define the outermost row of inclined channels.

In the above form of the porous structure, the perforations are formed through the intersections of the first and second parallel partition walls, so as to extend in the direction intersecting the rows of inclined channels.

The plurality of parallel rows of inclined channels of each honeycomb block may consist of two parallel rows.

In a further form of the instant porous structure, the above-indicted at least one packing consists of a plurality of packings which are superposed on each other in the nominal fluid flow direction. These packings are positioned relative to each other such that the directions of inclination of the inclined channels of the corresponding honeycomb blocks of the adjacently located packings are reversed to each other with respect to the nominal fluid flow direction, and such that the inclined channels of the corresponding honeycomb blocks of the adjacently located packings communicate with each other in a zigzag manner, thereby forming a plurality of zigzag fluid passages through the porous structure.

In a still further form of the porous structure, the partition walls of each honeycomb block have ceramic grains deposited on surfaces thereof. The average particle size of the ceramic grains may preferably fall within a range of 200–2000 $\mu$m.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which:

FIGS. 3(a), 3(b) and 3(c) are a plan view, a front elevational view, and a left-hand side end elevational view of the honeycomb block of FIG. 2;

FIGS. 5(a), 5(b) and 5(c) are a plan view, a front elevational view, and a left-hand side end elevational view of the honeycomb block of FIG. 4;

DETAILED DESCRIPTION OF THE PREFERRED EMBODIMENT

Figure 1:
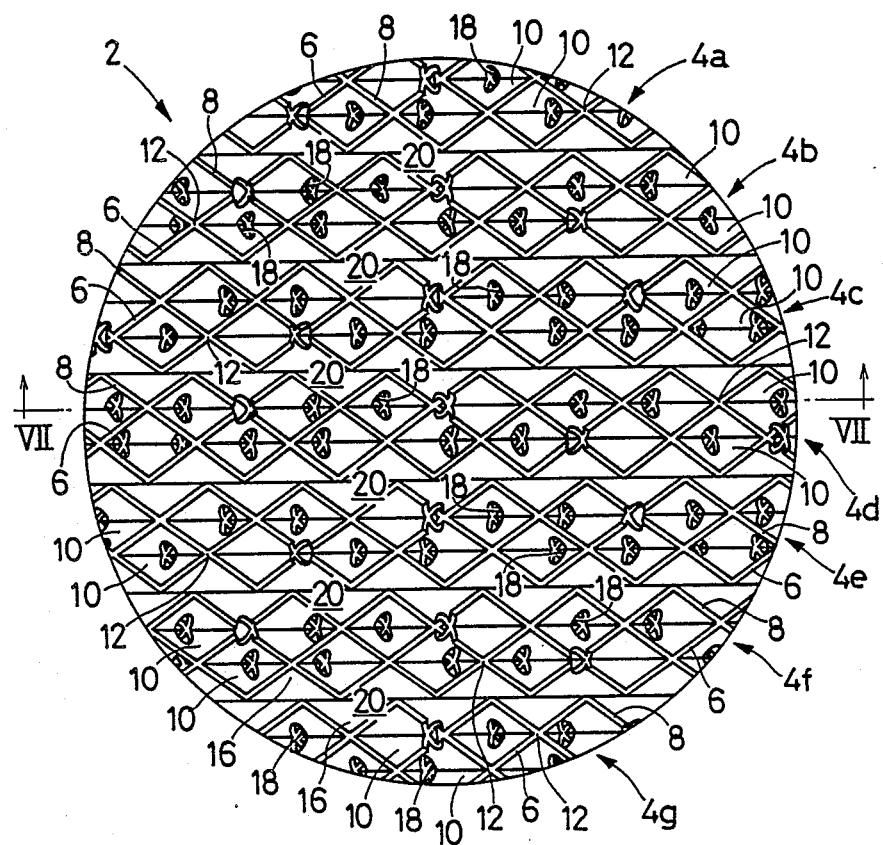
FIG. 1 is a plan view of one embodiment of a porous structure of the present invention, in the form of a porous packing which consists of seven honeycomb blocks.

Referring first to the plan view of FIG. 1, there is shown the presently preferred example of the porous structure of the invention in the form of a porous packing 2. The porous packing 2 consists of seven honeycomb blocks 4a through 4g which are juxtaposed in a first direction in a plane of the packing (plane of FIG. 1), which is perpendicular to a nominal direction of flow of a fluid or fluids through the packing. This direction will be hereinafter referred to as "nominal fluid flow direction". That is, the porous packing 2 is disposed so that the fluid or fluids are caused to flow generally in the direction perpendicular to the plane of FIG. 1. The seven honeycomb blocks 4a–4g are fixedly connected to each other such that parallel rows of fluid channels (which will be described) formed in each honeycomb block line in respective parallel planes parallel to the nominal fluid flow direction. As indicated also in FIG. 6, the porous packing 2 is a cylindrical body having a circular shape in cross section taken in the plane perpendicular to the nominal fluid flow direction. The packing 2 has a suitable thickness in the nominal fluid flow direction (indicated by arrow in FIG. 6), and is disposed so as to extend in the plane perpendicular to the nominal fluid flow direction. This plane is defined as the plane of the packing 2 or porous structure.

The seven honeycomb blocks 4a–4g are all identical with each other in construction, but the adjacent blocks are positioned differently, as described below. Each honeycomb block has two parallel rows of inclined channels. The construction of the honeycomb blocks 4a–4g will be described more specifically, referring to the centrally located honeycomb block 4d of FIGS. 2 and 3(a)–3(c) and the honeycomb block 4c of FIGS. 4 and 5(a)–5(c) located adjacent to the centrally located block 4d, by way of example. Each of the honeycomb blocks 4d, 4c has a plurality of first parallel partition walls 6 which are spaced apart from each other by a suitable distance in the plane of the packing 2, and a plurality of second parallel partition walls 8 which are spaced apart from each other by a suitable distance in a direction intersecting the first parallel partition walls 6. The first and second partition walls 6, 8 cooperate with each other to define a plurality of inclined channels or fluid passages 10 which have a quadrangular cross sectional shape, more precisely, a parallelogram in this specific example, as indicated in the various figures indicated above. The first and second partition walls 6, 8 have intersections 12 which define two parallel rows 14a, 14b which are spaced apart from each other in the first direction (indicated above) in which the honeycomb blocks 4a–4g are arranged. In other words, the inclined channels 10 are provided in the two parallel rows 14a, 14b, wherein the channels 10 of each row 14a, 14b are spaced apart from each other by the intersections 12, in a second direction perpendicular to the above-indicated first direction. The first and second partition walls 6, 8 further define voids or outer openings 16 which are open outwardly of the honeycomb block 4d, 4c. Each outer opening 16 is located between the two adjacent channels 10, such that the outer opening 16 is on the outer side of the corresponding intersection 12.

Figure 2:
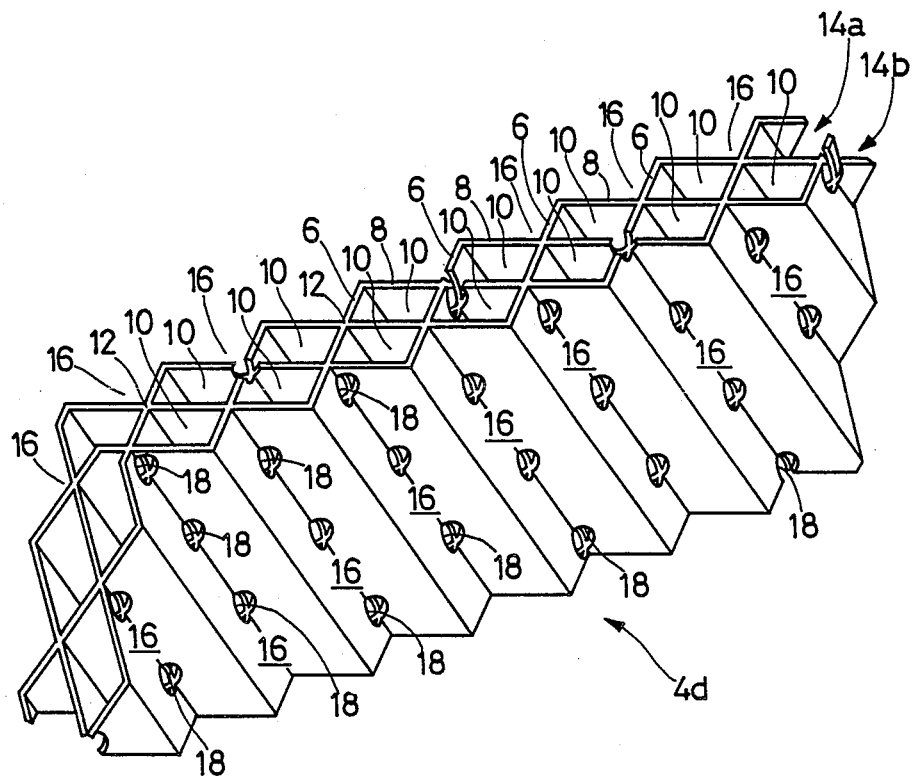
FIG. 2 and FIG. 4 are perspective views of the two adjacent honeycomb blocks of the packing of FIG. 1, respectively.
Figure 4:
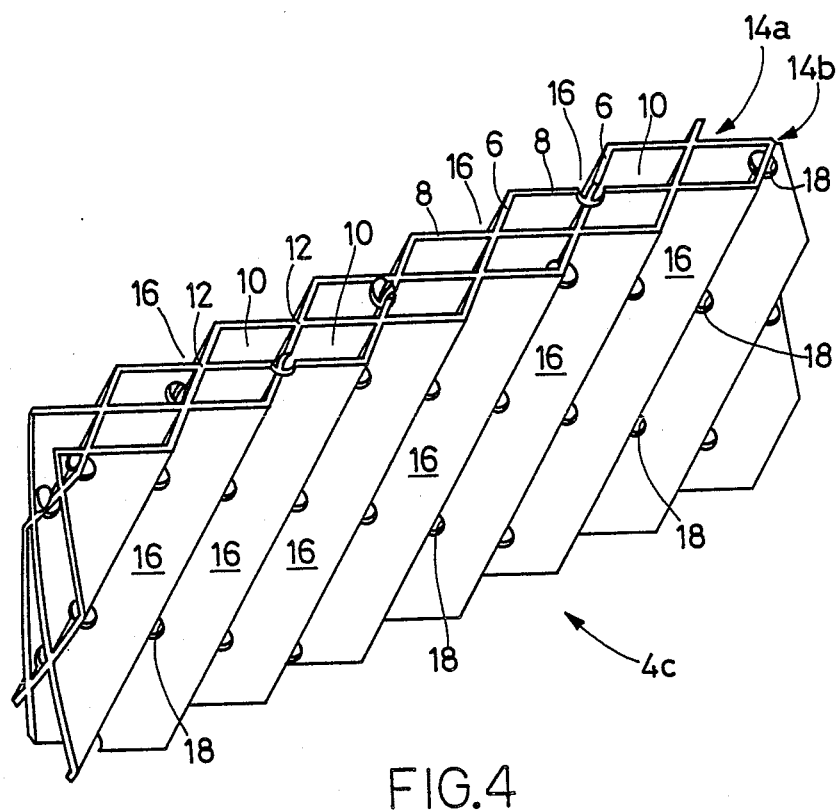

The first and second parallel partition walls 6, 8 are inclined with respect to the nominal fluid flow direction, so that the channels 10 defined by the inclined walls 6, 8 are inclined by a predetermined angle with respect to the nominal fluid flow direction. The inclined channels 10 have opposite open ends at respective upstream and downstream ends of the appropriate honeycomb block, as seen in the direction of thickness of the block, that is, in the nominal fluid flow direction. The angle of inclination of the inclined channels 10 is determined as needed, and is generally selected within a range of 45°–75° with respect to the nominal fluid flow direction. The intersections 12 define opposite corners of each inclined channel 10 which has a rhombic shape as seen in FIGS. 1, 3(a) and 5(a). The inclined channels 10 of each row 14a, 14b are arranged in the second direction perpendicular to the first direction in which the rows 14a, 14b are arranged in the plane of the packing 2. It will be understood that one of the voids formed on opposite sides of each intersection 12 as seen in the second direction constitutes the channel 10, while the other void constitutes the outer opening 16, in this specific example which has the two parallel rows 14a, 14b of inclined channels 10, as illustrated in FIGS. 2 and 4.

The partition walls 6, 8 of each honeycomb block 4d, 4c have perforations 18 in two parallel rows corresponding to the two parallel rows 14a, 14b of inclined channels 10, as seen the plan views of FIGS. 1, 3(a) and 5(a). As most clearly indicated in FIGS. 2 and 4, these perforations 18 are formed through the intersections 12 of the partition walls 6, 8, in a direction intersecting the rows 14a, 14b of the channels 10, more precisely, in the first direction in which the honeycomb block 4a–4g are juxtaposed. The perforations 18 are spaced apart from each other along each inclined channel 10, as indicted in FIGS. 2 and 4. The two rows of the perforations 18 associated with the two rows 14a, 14b of channels are arranged in a zigzag manner as illustrated in FIGS. 3(c)

and 5(c), such that each of the perforations 18 associated with one of the two adjacent rows 14a, 14b is positioned between the adjacent perforations 18 associated with the other of the two adjacent rows 14a, 14b, as viewed in the direction of extension of the rows 14a, 14b. The perforations 18 thus formed provide fluid communications between the adjacent inclined channels 10 of the same row 14a, 14b, between the adjacent inclined channels 10 of the adjacent rows 14a, 14b, and between the inclined channels 10 and the outer openings 16.

Figure 6:
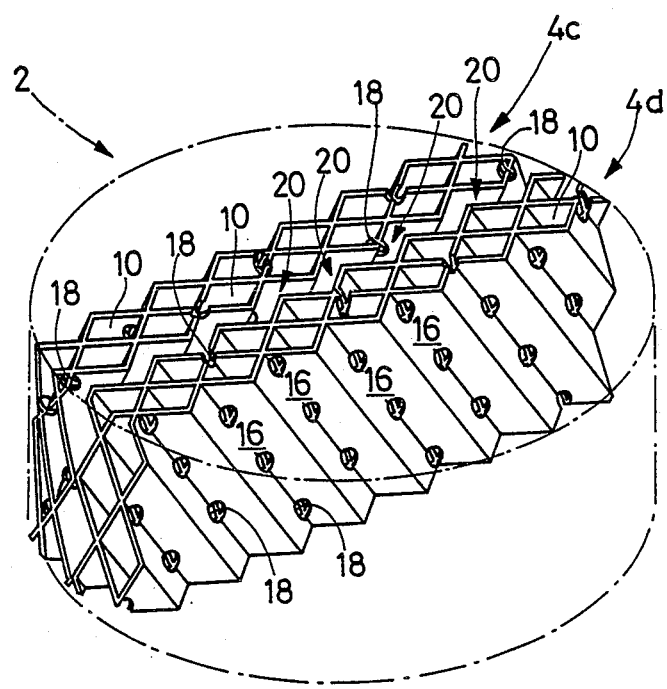
FIG. 6 is a perspective view showing the two adjacent honeycomb blocks of FIGS. 2 and 4, as positioned as part of the packing of FIG. 1.

The honeycomb blocks 4d and 4c are assembled in a juxtaposed relation with each other, such that the directions of inclination of the inclined channels 10 are reversed to each other with respect to the nominal fluid flow direction, as shown in FIG. 6. Further, the honeycomb blocks 4b and 4b are disposed on the side of the honeycomb block 4c remote from the centrally located honeycomb block 4d, and the honeycomb blocks 4e, 4f and 4g are disposed on the side of the honeycomb block 4d remote from the honeycomb block 4c, such that the directions of inclination of the inclined channels 10 of the adjacent blocks 4b-4b, 4b-4c, 4c-4d, 4d-4e, 4e-4f, 4f-4g are reversed to each other, that is, the channels 10 of one block intersect those of the adjacent blocks. Thus, the seven honeycomb blocks 4a-4g are connected to each other as a unitary member in the form of the porous packing 2. With the outer openings 16 located between the two adjacent honeycomb blocks 4a-4g of the packing 2, there are formed six complex channels 20 as indicated in FIGS. 1 and 6. Since each channel 20 is defined by the partition walls 6, 8 of the adjacent honeycomb blocks such that the channels 10 are inclined in the different directions with respect to the nominal fluid flow direction, the channel 20 has a considerably complicated space.

Figure 7:
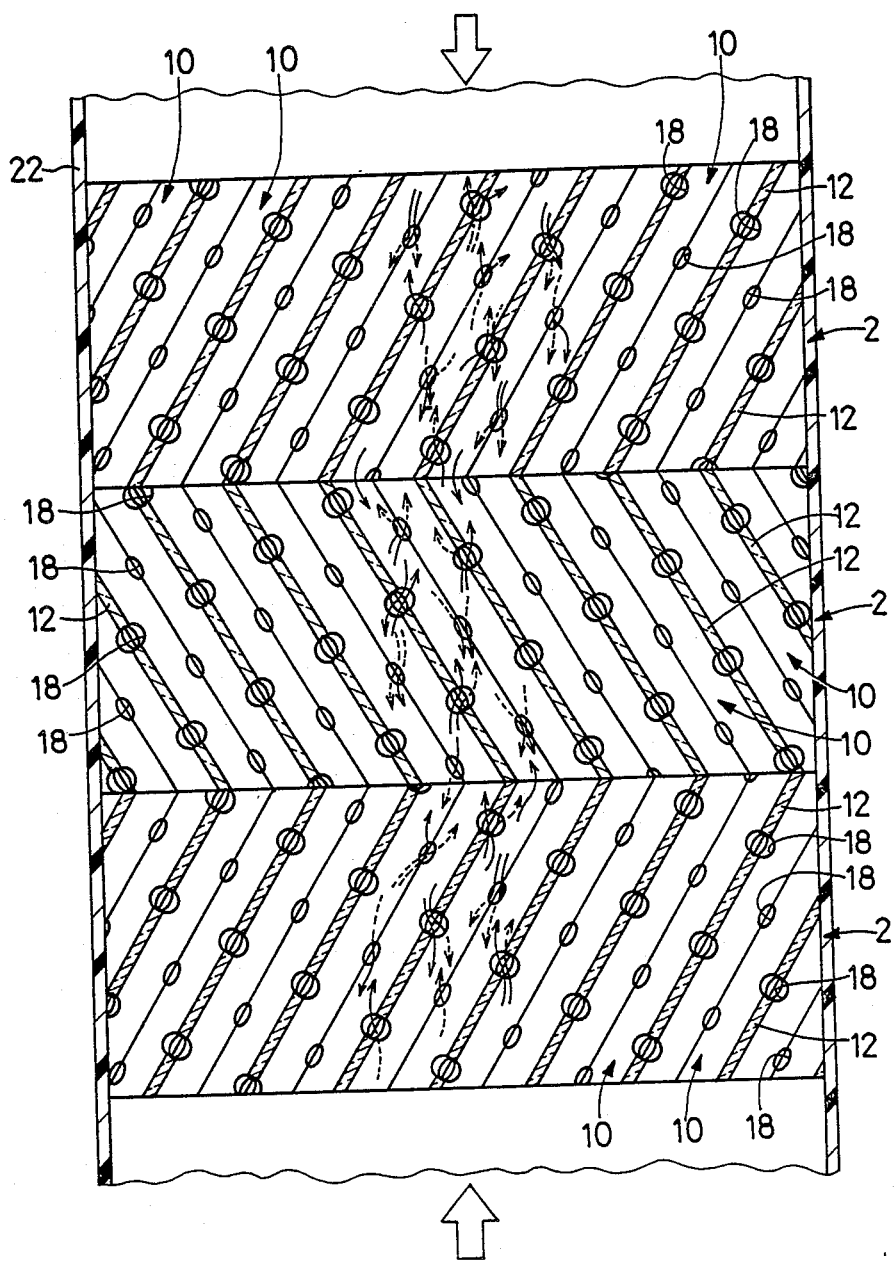
FIG. 7 is a fragmentary elevational view in cross section of a fluid contact equipment which includes a porous structure consisting of a stack of three packings similar to the packing of FIG. 1, the view corresponding to a cross sectional view taken along line VII—VII of FIG. 1.

While the porous packing 2 has been described, two more packings similar to the packing 2 are used in a stacked manner. FIG. 7 illustrates an example of a fluid-contact column 22 of a packed tower, wherein three porous packings 2 are superposed on each other, such that the directions of inclination of the inclined channels 10 of the corresponding honeycomb blocks 4a-4g of the adjacently located packings 2 are reversed to each other with respect to the nominal fluid flow direction (indicated by arrows in FIG. 7), so that the inclined channels 10 of the corresponding honeycomb blocks 4a-4g of the adjacently located packings 2 communicate with each other, in a zigzag manner, thereby forming a plurality of zigzag fluid passages through the stack of the packings 2, as indicted in FIG. 7. However, the porous structure according to the present invention may consist of only one piece of the porous packing 2, as well as a stack of the porous packings 2.

When two different fluids are introduced into the fluid-contact column 22 in the upward and downward directions as indicted by arrows in FIG. 7, the fluids flow through the zigzag fluid passages defined by the inclined channels 10 of the honeycomb blocks 4a-4g of the stacked packings 2. At the same time, the introduced fluids flow through the perforations 18, from one zigzag passage to another, more specifically, from one inclined cannel 10 to another in the same row 14a, 14b of the same honeycomb block, from one inclined channel 10 of one row 14a, 14b to another of the adjacent row 14a, 14b of the same honeycomb block, from one inclined channel 10 of one honeycomb block to another of the adjacent honeycomb block, and from one inclined channel 10 to the outer opening 16, i.e., complex channel 20 between the adjacent honeycomb blocks. Accordingly, the fluids may move not only in the generally vertical direction (nominal fluid flow direction), but also in the horizontal directions, i.e., in the first direction in which the honeycomb blocks 4a-4g are arranged, and in the second direction in which the inclined channels 10 of the same row 14a, 14b are spaced from each other. Thus, the instant porous structure consisting of the stacked packings 2 permits significantly improved efficiency of contact of the two fluids, and considerably enhanced manner of distribution of the fluid throughout the porous structure. The inclination of the first and second partition walls 6, 8 of the honeycomb blocks 4a-4g of each packing 2 facilitates horizontal flows of the fluids through the perforations 18 formed through the intersections 12, whereby the fluid contact efficiency of the porous structure is further improved.

The instant porous structure consisting of the stacked honeycomb packings 2 does not suffer from a problem of local blow or channelling of a gas without contacting a liquid, which is encountered in a conventional arrangement of honeycomb packings in a tower wherein the packings are regularly stacked with gaps or clearances left therebetween. Further, the instant porous structure provides for reduced pressure loss of the fluids, as compared with conventional irregularly dumped packings in the form of beads, pellets, or the like. Consequently, the instant porous structure permits uniform velocity of flow of the fluids throughout the column 22.

Even if the fluids are not evenly introduced into the inclined channels 10 of the honeycomb blocks 4a-4g from the open ends, the fluids may be evenly distributed or scattered by means of the flows through the perforations 18, in the vertical and horizontal directions (in the nominal fluid flow direction, and in the directions parallel to the plane of the packings 2, whereby the fluids may be evenly introduced into the individual channels 10 of the individual honeycomb blocks 4a-4g of the stacked packings 2. Hence, the fluid contact efficiency is maintained at a considerably high level in the present porous structure, without employing a special device installed within the packed tower, for uniform or even dispersion or distribution of the fluids.

The honeycomb blocks 4a-4g of the porous packing or structure are generally formed of a suitable ceramic material such as alumina, mullite, silica or cordierite, but may be formed of other materials such as synthetic resins.

As described later in connection with specific examples, it is desirable that suitable ceramic grains are deposited or otherwise fixed on the surfaces of the first and second partition walls 6, 8 of the honeycomb blocks 4a-4g, in order to give the packing 2 an increased ability of holding masses of the flowing fluids near the surfaces of the walls. The particle size of the ceramic grains is suitably determined depending upon the specific application of the packed tower or porous structure. Generally, the average particle size of the ceramic grains is held within a range of 200-2000 $\mu$m, preferably within a range of about 500-800 $\mu$m.

The ceramic grains may be deposited on the surfaces of the partition walls 6, 8 in the following manner, for example. That is, where the honeycomb blocks 4a-4g are made of a ceramic material, the blocks 4a-4g are bonded to each other by using a solution of a frit similar to the ceramic material of the blocks. The ceramic grains are deposited on the surfaces of the partition walls 6, 8 which have been coated with such a frit solution, and the honeycomb blocks with the ceramic grains thus deposited are fired into the porous structure, i.e., porous packing 2.

While the present invention has been described in its presently preferred embodiment with a certain degree of particularity, it is to be understood that the invention is not limited to the precise details of the illustrated embodiment, but may be embodied with various changes, modification, alternatives and improvements, which may occur to those skilled in the art, without departing from the spirit and scope of the invention.

For example, the cross sectional shape of the inclined channels 10 of the honeycomb blocks 4a-4g of the porous packing 2 may be hexagonal or other desired polygonal shapes, other than the quadrangular shape as in the illustrated embodiment. Further, the size of the inclined channels 10 and the number of the rows of the channels 10 may be suitably selected, depending upon the application of the porous structure.

While it is preferred that the perforations 18 be formed through the intersections 12 of the first and second partition walls 6, 8, in the direction perpendicular to the line of extension of the channels 10, the perforations 18 may be formed through the partition walls 6, 8, without penetrating the intersections, provided that the perforations 18 provide fluid communications between the inclined channels 10 of the adjacent rows 14a, 14b, and between the channels 10 and the outer openings 16 associated with the outermost row 14a, 14b.

To further clarify the concept of the present invention, Examples I and II according to the invention will be described.

EXAMPLE I

A honeycomb structure as illustrated in FIGS. 8(a), 8(b) and 8(c) and 9 was formed of a ceramic material. The honeycomb structure has rectangular holes 30, which give the inclined channels 10 of the honeycomb blocks 4a-4g of the porous packing 2 which has been described. The rectangular holes 30 has a cross sectional area which is equal to that of a circle having a diameter of 9 mm. The holes 30 are defined by partition walls 32 which have a thickness of 0.9 mm. The honeycomb structure has outer dimensions of 149 mm×163 mm, and an outer dimension of 310 mm as measured along the length of holes 30.

Figure 8A:
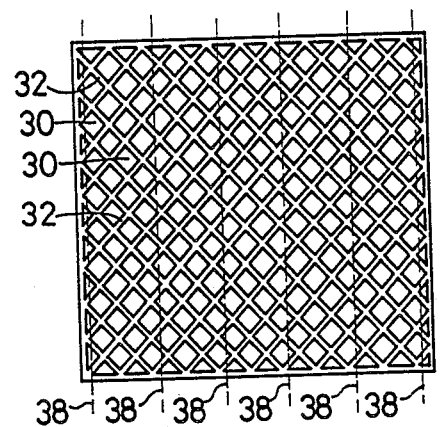
FIGS. 8(a), 8(b) and 8(c) are a left-hand side end elevational view, a plan view and a front elevational view, respectively, of a honeycomb structure of Example 1, indicating planes of cutting the honeycomb structure into honeycomb blocks, and locations of throughholes which correspond to perforations formed through the honeycomb blocks.
Figure 8B:
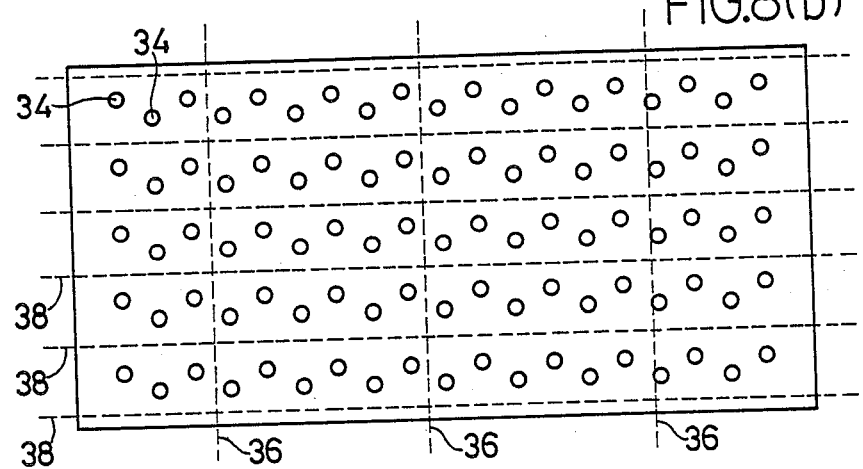
Figure 8C:
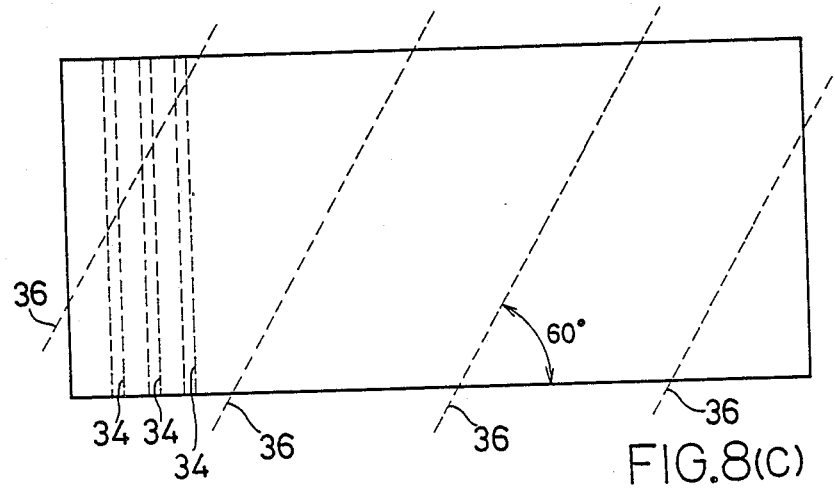
Figure 9:
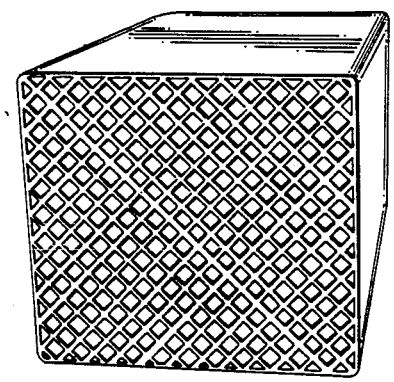
FIG. 9 is a photograph showing the honeycomb structure manufactured in Example 1.

Through-holes 34 having a diameter of 5 mm were formed in parallel rows, through the intersections of the partition walls 32, in a direction perpendicular to the line of extension of the holes 30, such that the through-holes 34 are spaced apart from each other by a distance of 30 mm, and such that the through-holes 34 of the two adjacent rows are disposed in a zigzag manner, with each through-hole 34 of one row located between the adjacent through-holes 34 of the adjacent row, as seen in the direction of extension of the rows. The thus constructed honeycomb structure was cut at 60° as indicated in FIG. 8(c), in planes 36 which are spaced apart from each other by a distance of 85.5 mm. Thus, medium-sized honeycomb blocks were prepared. As illustrated in FIGS. 8(a) and 8(b), the medium-sized honeycomb blocks were cut in planes 38, in the direction of extension of the rectangular holes 30, so that each small-sized honeycomb block obtained as a result of cutting has two parallel rows of the holes 30. In the obtained small-sized honeycomb blocks, the direction of extension of the holes 30 forms 60° with respect to the cut planes 38.

The thus prepared small-sized honeycomb blocks (seven blocks) were juxtaposed such that the direction of inclination of the rectangular holes 30 in the adjacently located blocks are reversed with each other. A solution of a frit was applied to the obtained assembly of the seven small-sized honeycomb blocks. Before the frit solution was dried, ceramic grains having an average particle size of 50μm were deposited over the entire surfaces of the partition walls 32 of the blocks. Then, the assembly was fired into an integral body. Subsequently, the fired body was cut into a cylindrical shape having a diameter of 150 mm. In this manner, there was formed a porous packing A which has an outside diameter of 150 mm, and a height or thickness of 70 mm. The prepared prous packing A corresponds to the porous packing 2 of FIG. 1.

Five porous packings identical with the obtained packing A were superposed on each other such that the rectangular holes 30 in the two adjacently located packings form 90°. More specifically, the line of extension of the holes 30 in the upper one of the two adjacent packings form 45° with respect to the interface between the two packings, and the line of extension of the holes 30 in the lower packing form 45° with respect to the same interface, so that the holes 30 in the two packings cooperate to form passages which are bent at 90° at the interface. The thus assembled five porous packings were placed in the fluid-contact column of a packed tower, as shown in FIG. 7. A stream of air containing about 1000 ppm of $NH_3$ (ammonia) was introduced into the packed column 22 through the inlet at the bottom of the column. Water was introduced at the top of the column at a rate of 6000 kg/m²/hr. so that the water flowing down the column contacts the up-flowing air in a countercurrent manner. Measurements were made of pressure loss and absorption efficiency of ammonia. The obtained measurements of the instant porous structure (A) were compared with the corresponding data obtained on a porous structure (B) without the ceramic grains deposited, and on a porous structure (C) as disclosed in U.S. Pat. No. 4,7119,090 which consists of three porous packings each consisting of five honeycomb blocks having inclined channels of 60°. The measurements are idicated in Table 1.

TABLE 1

| | Air Flow Rate (m/s) | Absorption Efficiency (%) | Pressure Loss (mmAg/m) |
|---|---|---|---|
| Instant Structure (A) With grains | 1 | 91.8 | 13 |
| | 2 | 84.1 | 53 |
| Instant Structure (B) without grains | 1 | 90.3 | 11 |
| | 2 | 81.2 | 52 |
| Comparative (U.S. Pat. No. 4,419,090) | 1 | 87.1 | 12 |
| | 2 | 77.2 | 52 |

It will be understood that the porous structure (A) with the ceramic grains deposited thereon and the porous structure (B) without the ceramic grains, both according to the principle of the invention, demonstrated substantially the same pressure loss as the comparative example, and exhibited about 4-7% improvement in the absorption efficiency of ammonia. The porous structure (A) with the ceramic grains showed about 1-3% improvement in the ammonia absorption efficiency over the porous structure (B).

EXAMPLE II

Figure 10:
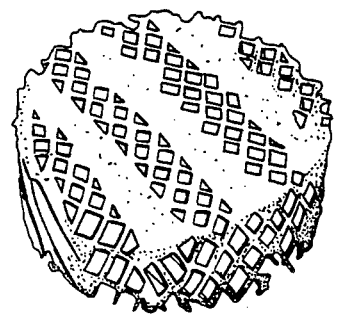
FIG. 10 is a photograph showing a porous packing prepared from the honeycomb structure of Example 1.

The porous packings with the ceramic grains (as shown in FIG. 10) of Example 1 were superposed on each other in order to obtain a porous structure having a total height of 1000 mm. A 150 mm diameter column of a distillation tower was filled with the prepared porous structure. The bottom portion of the packed column was charged with a mixture of methanol and water in a mole ratio of 10 to 90. The mixture liquid was vaporized by heating wit a steam, so that the gaseous mixture was caused to flow upward through the porous structure. The gas emitting from the top of the column was liquefied by a condenser, and the liquid was distributed over the top of the structure. Thus, the distilling operation was effected. Measurements were made of pressure loss, and molar fractions of methanol at the bottom and top portions of the column. The obtained measurements were compared with the crresponding data obtained on the comparative example according to U.S. Pat. No. 4,719,090. The measurements are indicated in Table 2.

TABLE 2

|  | Gas Flow Rate (m/s) | Molar Fraction of Methanol | | Pressure Loss (mmAg/m) |
| --- | --- | --- | --- | --- |
|  |  | Bottom | Top |  |
| Instant Structure | 1 | 4 | 98 | 11 |
| Comparative | 1 | 4 | 95 | 11 |

The analysis of the above table reveals that while the pressure loss in the instant porous structure is almost the same as that in the comparative example according to U.S. Pat. No. 4,719,090, the molar fraction of methanol in the top portion of the column filled by the instant porous structure is 3% higher than that in the column filled by the comparative porous structure.

What is claim is:

1. A porous structure through which at least one fluid flows in a nominal direction, comprising:
    at least one packing having a predetermined thickness in said nominal direction, said at least one packing being disposed so as to extend in a plane perpendicular to said nominal direction;
    each of said at least one packing consisting of a plurality of honeycomb blocks arranged in a first direction in said plane;
    each of said plurality of honeycomb blocks including a plurality of partition walls which define a plurality of inclined channels which are inclined by a predetermined angle with respect to said nominal direction, each of said inclined channels having opposite open ends at respective upstream and downstream ends of said each honeycomb block as seen in said nominal direction, said plurality of inclined channels being provided in a plurality of parallel rows arranged in said first direction, said inclined channels of each of said rows being spaced apart from each other in a second direction in said plane, which second direction is perpendicular to said first direction;
    said plurality of partition walls including intersections by which said inclined channels of said each row are spaced apart from each other in said second direction, said partition walls further defining a pair of voids between adjacent channels of said inclined channels of said each row, said pair of voids being disposed on opposite sides of each of said intersections as seen in said first direction, at least one of said pair of voids constituting part of the inclined channels of the rows adjacent to said each row, one of said pair of voids associated with the row which forms an outermost row forming an outer opening which is open outwardly of said each honeycomb block;
    said partition walls having a plurality of perforations formed therethrough in a direction intersecting said rows of the inclined channels, so as to provide fluid communications between said adjacent channels of said each row, between the inclined channels of the adjacent rows, and between said inclined channels and said outer opening; and
    said plurality of honeycomb blocks being positioned and connected to each other such that directions of inclination of said inclined channels of the adjacent honeycomb blocks are reversed to each other with respect to said nominal direction of flow of said at least one fluid, and such that said outer openings formed between said adjacent honeycomb blocks define a complex channel therebetween.

2. A porous structure according to claim 1, wherein said perforations are formed through said intersections of said partition walls of said each honeycomb block, thereby providing said fluid communications.

3. A porous structure according to claim 2, wherein said perforations are formed in a direction perpendicular to a line of extension of said inclined channels, said perforations permitting flow of said at least one fluid therethrough in said second direction.

4. A porous structure according to claim 3, wherein said perforations of said each honeycomb block consist of a plurality of perforations associated with each of said parallel rows of inclined channels, which perforations are spaced apart from each other by a predetermined distance in said second direction, said perforations associated with the adjacent rows of inclined channels being arranged in a zigzag manner such that each of the perforations associated with one of said adjacent rows is positioned between the adjacent perforations associated with the other of said adjacent rows, as viewed in said second direction.

5. A porous structure according to claim 1, wherein said partition walls of said each honeycomb block consist of a plurality of first mutually spaced-apart parallel partition walls, and a plurality of second mutually spaced-apart parallel partition walls which intersect said plurality of first parallel partition walls, at said intersections, such that said first and second parallel partition walls cooperate to define said rows of inclined channels such that said rows are arranged in said first direction and such that each of said inclined channels has a quadrangular cross sectional shape, each of said outer openings being defined by one of said first parallel partition walls which partially defines said outermost row of inclined channels, and one of said second parallel partition walls which partially define said outermost row of inclined channels.

6. A porous structure according to claim 5, wherein said perforations are formed through said intersections of said first and second parallel partition walls, so as to extend in said direction intersecting the rows of inclined channels.

7. A porous structure according to claim 5, wherein said plurality of parallel rows of inclined channels consist of two parallel rows.

8. A porous structure according to claim 1, wherein said at least one packing consists of a plurality of packings which are superposed on each other in said nominal direction in which said at least one fluid flows, said plurality of packings being positioned relative to each other such that the directions of inclination of said inclined channels of the corresponding honeycomb blocks of the adjacently located packings are reversed to each other with respect to said nominal direction, and such that said inclined channels of said corresponding honeycomb blocks of said adjacently located packings communicate with each other in a zigzag manner, thereby forming a plurality of zigzag fluid passages through the porous structure.

9. A porous structure according to claim 1, wherein the partition walls of said each honeycomb block have ceramic grains deposited on surfaces thereof.

10. A porous structure according to claim 9, wherein said ceramic grains have an average particle size of 200–2000 $\mu$m.

* * * * *